United States Patent [19]
Willmann et al.

[11] Patent Number: 5,453,337
[45] Date of Patent: Sep. 26, 1995

[54] USE OF VANADIUM OXIDE AND/OR ALUMINUM BRONZES AS A CATHODE MATERIAL IN ELECTROCHEMICAL GENERATORS

[75] Inventors: Patrick Willmann, Montgiscard; Jean-Pierre Pereira-Ramos, Marolles en Brie; Rita Baddour-Hadjean, Gournay; Noël Baffier, Bures sur Yvette, all of France

[73] Assignee: Centre National D'Etudes Spatiales, Paris, France

[21] Appl. No.: 244,741

[22] PCT Filed: Dec. 9, 1992

[86] PCT No.: PCT/FR92/01167

§ 371 Date: Jul. 5, 1994

§ 102(e) Date: Jul. 5, 1994

[87] PCT Pub. No.: WO93/12550

PCT Pub. Date: Jun. 24, 1993

[30] Foreign Application Priority Data

Dec. 13, 1991 [FR] France .................. 91 15495

[51] Int. Cl.$^6$ .................. H01M 4/52; H01M 4/48
[52] U.S. Cl. .................. 429/218; 429/221; 429/194
[58] Field of Search .................. 429/218, 221

[56] References Cited

U.S. PATENT DOCUMENTS

| | | | |
|---|---|---|---|
| 4,668,594 | 5/1987 | Yamaura et al. | 429/194 |
| 4,874,680 | 10/1989 | Koshiba et al. | 429/197 |
| 5,175,068 | 12/1992 | Ryan | 429/218 |
| 5,298,349 | 5/1994 | Tekeuchi | 429/219 |

Primary Examiner—Stephen Kalafut
Assistant Examiner—Richard H. Lilley, Jr.
Attorney, Agent, or Firm—Pearne, Gordon, McCoy & Granger

[57] ABSTRACT

The use of vanadium oxide iron and/or aluminium bronzes as a cathode material in electrochemical generators is described. The cathode material is a vanadium oxide bronze having formula: $M^1_{x1}M^2_{x2}V_2O_5$, wherein $M^1$ is a vanadium oxide bronze or iron, $M^2$ is a metal different from $M^1$ having valency n and chosen from alkali metals, alkaline earth metals, transition metals and aluminium, and $x_1$ and $x_2$ are such that $0.06 \leq x_1 \leq 0.13$; $0 \leq x_2 \leq 0.20$; and $0.27 \leq 3x_1 \leq nx_2 \leq 0.39$; and may be combined as a cathode (9) with an Li or Li alloy anode (5) and with an electrolyte consisting of lithium perchlorate in propylene carbonate.

8 Claims, 6 Drawing Sheets

USE OF VANADIUM OXIDE AND/OR ALUMINUM BRONZES AS A CATHODE MATERIAL IN ELECTROCHEMICAL GENERATORS

This is application is a national phase of a application PCT/FR92/01167 with publication number WO 93/12550.

The present invention relates to the use of vanadium oxide bronzes as a cathode material in electrochemical generators.

It more particularly applies to secondary electrochemical generators, whose operation is based on the intercalation of a metal ion, such as lithium in the cathode material.

For close to twenty years, the use of primary, lithium electrochemical generators has provided energy sources with better performance characteristics than conventional batteries with respect to the energy density, the life and the operation in a wide temperature range. Such primary generators are particularly used for the supply of equipment requiring low current densities, such as watches, calculators and for maintaining memories.

In view of the good performance characteristics of these primary lithium generators, much research has been carried out with a view to producing secondary lithium generators having the characteristics inherent in lithium anode batteries and the longer life of accumulators. The development of such generators involves the reversibility of the reactions at both the anode and the cathode.

In addition, much research has been devoted to investigating cathode materials able to reversibly insert metal ions such as lithium ions. Among these considerable research has been directed at those based on vanadium pentoxide $V_2O_5$, which have high performance characteristics as a result of the standard, very high potential of $V^{5+}$ and the compatibility of the oxidation potential of these materials with the stability range of the organic electrolytes conventionally used in electrochemical generators. Moreover, $V_2O_5$ has a structure intermediate between the tunnel structure of rutile-type oxides and that of $MoO_3$-type oxide laminas.

The operating characteristics of a secondary electrochemical generator using $V_2O_5$ as the electrode material will largely depend on the reversibility of the insertion reaction of a metal such as lithium ($Li^+$) in the host lattice of the $V_2O_5$, in accordance with the following reaction diagram:

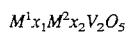

$$V_2O_5 + xe^- + xLi^{3O} \rightleftharpoons Li_xV_2O_5$$

Thus, the aim is to obtain a good reversibility of this process and preferably for a high voltage, with a maximum faradic capacitance, i.e. a maximum lithium x insertion level over a large number of galvanostatic cycles.

With regards to the $V_2O_5$ cycling behaviour, it is known that the constant current reduction of $V_2O_5$ in a conventional electrolytic medium takes place in four separate stages as described by Kumagai et al in Electrochimica Acta, 28, 1983, pp 17–22.

FIG. 1 illustrates the typical $V_2O_5$ discharge curve in propylene carbonate containing 1 mole/l of $LiClO_4$ at 20° C. using $V_2O_5$ at the cathode and a lithium anode.

FIG. 1, which represents the evolution of the potential as a function of the exchanged lithium quantity, shows that the first two stages of said reduction, which are characterized by a potential above 3 V and a $Li_yV_2O_5$ composition range with $0 \leq y \leq 1$, corresponding to the conventional cycling of $Li/V_2O_5$ generators for which a perfect reversibility is observed. The third range corresponds to a partial reversibility loss, whose mechanism has not been completely explained, and a complete irreversibility is observed after a deep discharge involving more than 2.4 lithium ions.

Much research has also been carried out with a view to improving the cyclability of materials similar to $V_2O_5$ in order to bring about a greater reduction involving the third and fourth insertion stages located at 2.2 and 1.8 V. Electrode materials with a greater reduction are described e.g. by Cocciantelli et al in Journal of Power Sources, 34, 1991, pp 103–111 and in FR-A-2 655 777, as well as by Delmas et al in Journal of Power Sources, 34, 1991, pp 113–188 and WO 90/11623.

Thus, in said two documents the mass capacitance of an electrochemical generator has been increased by increasing the lithium insertion level.

Other research carried out on vanadium pentoxide-based materials has led to the production of metal oxide bronzes such as $Na_{0.33}V_2O_5$ by a sol-gel process, in order to improve the performance characteristics of such materials, as described in FR-A-2 616 013.

As a result of recent research, other cathode materials based on vanadium pentoxide bronze have been developed, which have improved properties compared with $V_2O_5$ as a result of the presence of appropriate elements.

The invention relates to an electrochemical generator comprising an anode, a cathode comprising a vanadium pentoxide-based cathode material and a conductive electrolyte containing ions which can be intercalated in the cathode material, characterized in that the cathode material is a vanadium pentoxide bronze of formula:

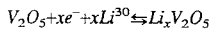

$$M^1{}_{x_1}M^2{}_{x_2}V_2O_5$$

in which $M^1$ represents the trivalent aluminium or iron, $M^2$ represents a metal different from $M^1$ of valency n chosen from among alkali metals, alkaline earth metals, transition metals and aluminium, and $x_1$ and $x_2$ are such that $0.06 \leq x_1 \leq 0.13$;

$0 \leq x_2 \leq 0.20$; and $0.27 \leq 3x_1 + nx_2 \leq 0.39$.

In said vanadium pentoxide bronze, the presence of metal $M^1$ (iron or aluminium) gives the cathode material an electronic conductivity well above that of $V_2O_5$, as well as the possibility of inserting more lithium than in $V_2O_5$.

Moreover, the possible presence in said material of a second metal $M^2$, e.g. sodium, makes it possible to adapt the characteristics of the material to the contemplated uses applications by producing a mixed structure with two imbricated lattices, e.g. a two-phase system with the coexistence of an orthorhombic phase and a monoclinic phase.

Generally, when $M^2$ is a metal other than Al or Fe, the quantity of $M^2$ is low, i.e. $x_1$ is at least 0.06.

As examples of alkali metals and alkaline earth metals which can be used for $M^2$, reference can be made to lithium, sodium, potassium, calcium and magnesium.

The transition metals used for $M^2$ are the metals of periods 3 to 12 of the 18 column table of the periodic classification, i.e. scandium, yttrium, lanthanides, actinides, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver and gold.

In the case of these transition metals a choice is e.g. made of iron, cobalt, copper, chromium or zirconium.

Preferably, according to the invention, use is made of a bronze of formula $M^1{}_{x_1}V_2O_5$ with $M^1$ having the meaning given hereinbefore and $x_1$ such that $0.09 \leq x_1 \leq 0.13$ or a bronze of formula $Fe_{x1}Al_{x2}V_2O_5$ with $x_1$ and $x_2$ having the meanings given hereinbefore.

The bronzes used as the cathode material in the invention can be prepared by conventional processes, particularly by that described in FR-A-2 616 013.

This process consists of carrying out an ion exchange on a vanadium pentoxide xerogel in order to replace the $H^+$ cations of said gel by $M^1$ and optionally $M^2$ atoms, e.g. by immersing the gel in an aqueous solution of a salt of $M^1$ optionally containing a salt of $M^2$. Following said ion exchange, a heat treatment is carried out at a moderate temperature chosen as a function of $M^1$ and $M_2$.

According to the invention, the bronze complying with the above formula is used as the cathode material in an electrochemical generator comprising a cathode, an anode and a conductive electrolyte containing ions which can be intercalated in said material.

In this generator, the anode can be based on lithium, e.g. of lithium, lithium alloy or a lithium insertion compound such as compounds based on carbon or oxide, e.g. tungsten oxide.

The electrolytes used can be liquid electrolytes, solid electrolytes or lithium ion conductive polymers.

When use is made of a liquid electrolyte, the latter can be constituted by a solution of lithium salt in an appropriate solvent, generally an organic and aprotic solvent, which can e.g. be chosen from within the group of cyclic ethers and esters having a straight chain and mixtures thereof.

As examples of an organic solvent which can be used, reference can be made to propylene carbonate, ethylene carbonate, tetrahydrofuran, dioxolan and 1,2-dimethoxyethane.

The organic solvent can also be constituted by a sulphone, e.g. dimethyl sulphone, with a view to operating in the temperature range 80° to 180° C.

The lithium salts can e.g. be chosen from among lithium perchlorate, lithium tetrafluoroborate, lithium trifluoromethane sulphonate, lithium hexafluorophosphate, lithium hexafluoroarsenate and mixtures thereof.

When use is made of a solid electrolyte, the latter can be constituted by a lithium glass e.g. obtained from $P_2S_5$, $Li_2S$ and LiI or $B_2S_3$, $Li_2S$ and LiI.

In the case where the electrolyte is constituted by a polymer, it can be a polyethylene oxide filled with a lithium salt, like those described hereinbefore.

To be usable in the generator according to the invention, the cathode material is generally mixed with an electronic conductive material such as carbon black, graphite and/or carbon fibres or powder. In this case, it is possible to prepare the electrode by mixing a bronze powder of formula $M^1_{x1}M^2_{x2}V_2O_5$ with carbon black, graphite and/or carbon powder or fibres, followed by the compression of said mixture to the desired form. It is also possible to deposit the mixture on a current lead e.g. constituted by an electronic conductive material grid such as stainless steel or nickel. It is also possible to mix a bronze powder according to the invention with acetylene black, graphite and polytetrafluoroethylene and then inlay said material on a stainless steel grid.

BRIEF DESCRIPTION OF DRAWINGS

Other features and advantages of the invention can be better gathered from the following non-limitative description and with reference to the attached drawings, wherein show.

The following examples illustrate the preparation of the cathode materials used in the invention.

Example 1: Preparation of $Fe_{0.11}V_2O_5$

Preparation firstly takes place of a vanadium pentoxide $V_2O_5$ gel by acidifying a solution of a sodium salt such as sodium metavanadate in such a way as to obtain decavanadic acid, which polymerizes spontaneously in water at ambient temperature in order to give by polycondensation the vanadium pentoxide gel corresponding to the formula:

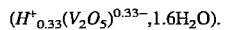

$$(H^+_{0.33}(V_2O_5)^{0.33-}, 1.6H_2O).$$

Following the deposition of the gel on a glass plate and drying in air, ion intercalation takes place in order to replace the $H^+$ cations by iron immersing the thin vanadium pentoxide xerogel layer on the glass plate in an aqueous 0.1 mole/l iron nitrate solution. After reacting for 30 min, the xerogel plate is removed and abundantly rinsed with distilled water, followed by drying at ambient temperature. This gives the hydrated intercalation product of formula $Fe_{0.11}V_2O_5, 2.35H_2O$. The intercalation product then undergoes a heat treatment at 535° C. for approximately 1 h in a furnace open to the air. This gives the metal bronze of formula $Fe_{0.11}V_2O_5$.

Figure 1:
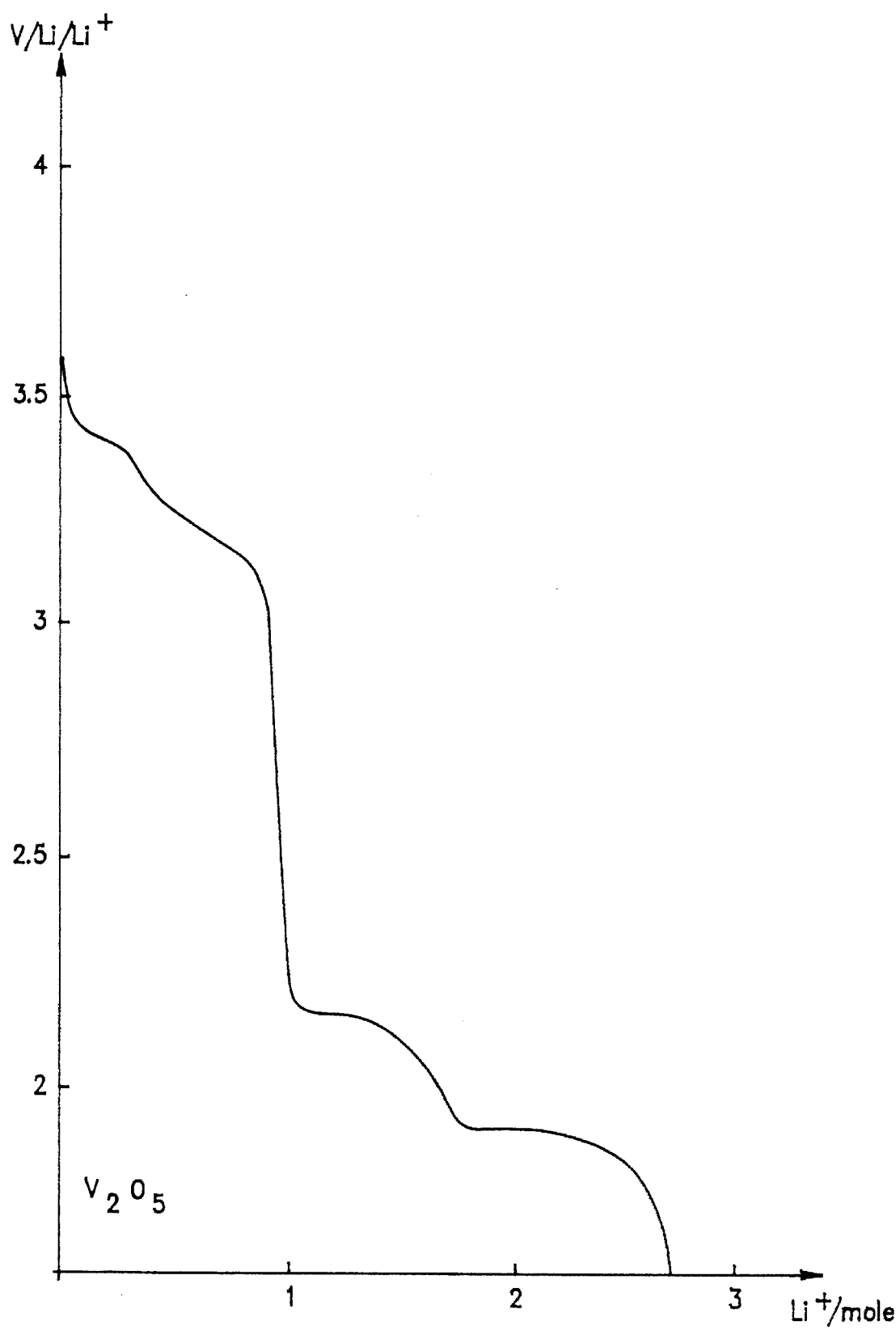
FIG. 1, already described, the discharge curve of $V_2O_5$, i.e. the potential as a function of the number of inserted lithium ions.
Figure 2:
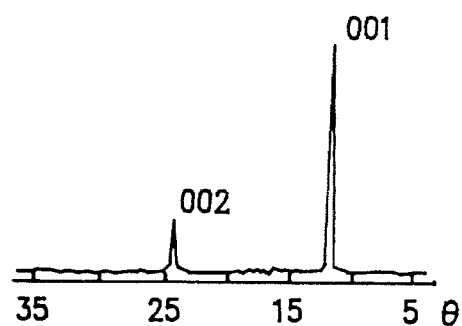
FIGS. 2 to 5 are X-ray diffraction spectra of cathode materials according to the invention.

FIG. 2 shows the X-ray diffraction spectrum in reflection geometry of the thin film product obtained in this way.

The spectrum obtained shows a preferred and extremely marked orientation of the 001 planes corresponding to the existence of horizontal planes stacked in accordance with the axis c. Only the lines 001 and 002 are visible with relative intensities of 100 and 27. This spectrum is typical of an alpha orthorhombic bronze phase.

Figure 3:

FIG. 3 shows the X-ray diffraction spectrum of the ground product.

Table 1 gives the relative intensities of the diffraction lines of said thin film bronze in powder form.

TABLE 1

| hkl | 200 | 001 | 101 | 110 | 400 | 011 | 310 | 002 | 102 | 600 | 020 |
|---|---|---|---|---|---|---|---|---|---|---|---|
| Ground | 12 | 100 | 18 | 43 | 38 | 12 | 20 | 15 | 7 | 7 | 15 |
| Thin film | / | 100 | / | / | / | / | / | 27 | / | / | / |

Example 2: Preparation of $Al_{0.11}V_2O_5$

The same operating procedure as in example 1 is followed for preparing said orthorhombic bronze, except that for the intercalation of the aluminium use is made of a 0.1 mole/l aluminium nitrate solution and the heat treatment is performed at 600° C. for 1 hour.

This gives the orthorhombic bronze of formula $Al_{0.11}V_2O_5$.

Figure 4:
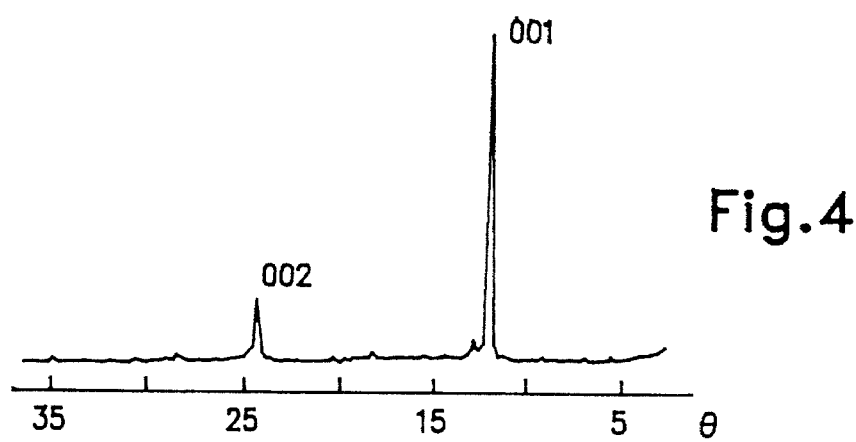
Figure 5:
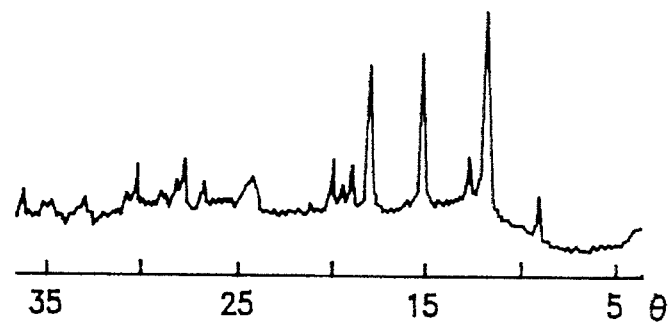

The X-diffraction spectra of the thin film product and the ground product are respectively shown in FIGS. 4 and 5.

As in the case of iron, only the lines 002 and 001 are visible on the spectrum of the thin film product.

Figure 6:
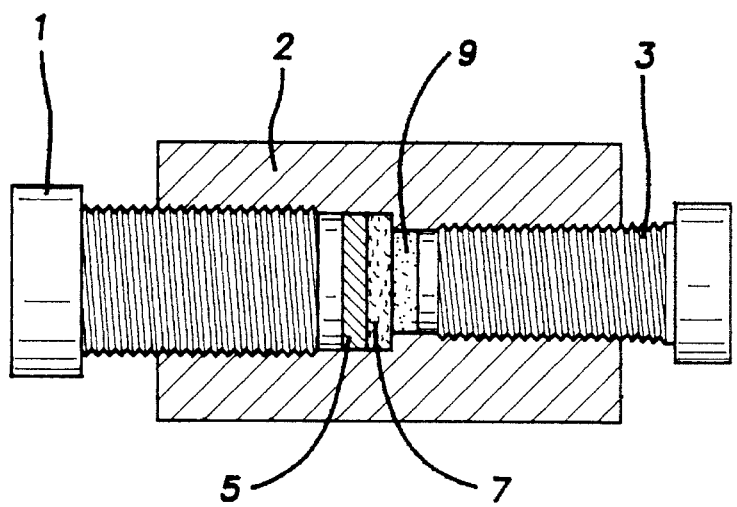
FIG. 6 Diagrammatically and in vertical section a lithium electrochemical generator according to the invention.

The metal bronzes obtained in examples 1 and 2 can be used as cathode material in the electrochemical generator of FIG. 6. For this use, a mixture of graphite and bronze powder is prepared containing 90% by weight graphite and this is compressed to the desired shape.

FIG. 6 shows that the generator comprises two metal screws 1 and 3 placed in a polytetrafluoroethylene envelope (2), between which are successively arranged an anode (5) constituted by a freshly cut, diameter 14 mm aluminium and lithium alloy LiAl disk, a glass fibre separator (7), a cathode constituted by a disk (9) with a surface of 1 cm² and a thickness of 0.5 mm formed from a mixture of approximately 20 mg of powders containing 10% by weight bronze and 90% by weight graphite obtained previously and an electrolyte impregnating the glass fibre separator (7) and the cathode (9).

The electrolyte is constituted by a solution of lithium perchlorate in distilled propylene carbonate containing 1 mole (106.4 g) of lithium perchlorate per litre and use is made of 0.2 ml of this electrolyte for impregnating the separator (7) and the positive electrode (9).

The assembly of the two electrodes and the separator is compressed by the metal screws (1) and (3), which also serve as current collectors. The voltage of the above generator is approximately 3.5 V.

The electrochemical properties of the cathode material formed by $Fe_{0.11}V_2O_5$ is tested by carrying out a voltamperometric cycling of the electrode at a speed of 0.13 mV/s. The voltamperogram obtained under these conditions and which illustrates the intensity in pA as a function of the potential in V based on Li/Li⁺ is shown in FIG. 7.

Figure 8:
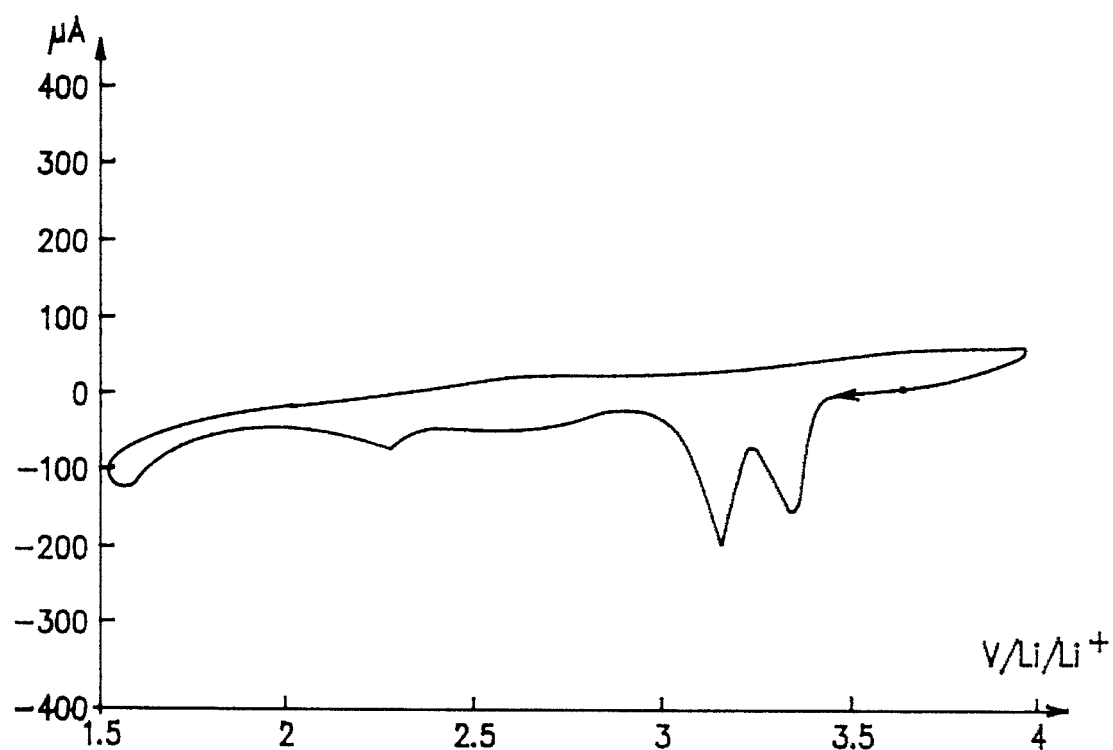
FIG. 8 A redox voltamperogram of the $V_2O_5$ cathode material given for comparison purposes.

For comparison purposes, FIG. 8 shows the voltamperogram obtained under the same conditions when the electrode material is constituted by orthorhombic $V_2O_5$ mixed with graphite in the same proportions.

Figure 7:
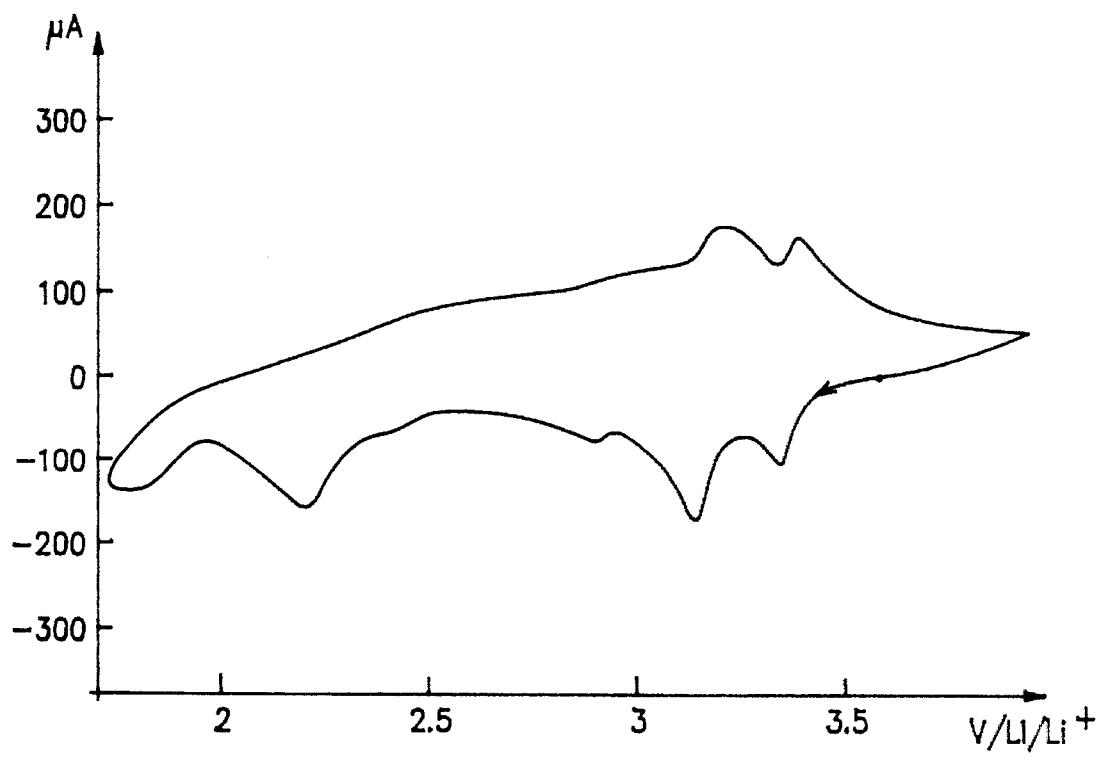
FIG. 7 A redox voltamperogram of the cathode material $FeO_{0.11}V_2O_5$ according to the invention.

It is clear from FIGS. 7 and 8 that the cathode material according to the invention has an excellent reversibility, which is not the case with $V_2O_5$.

Figure 9:
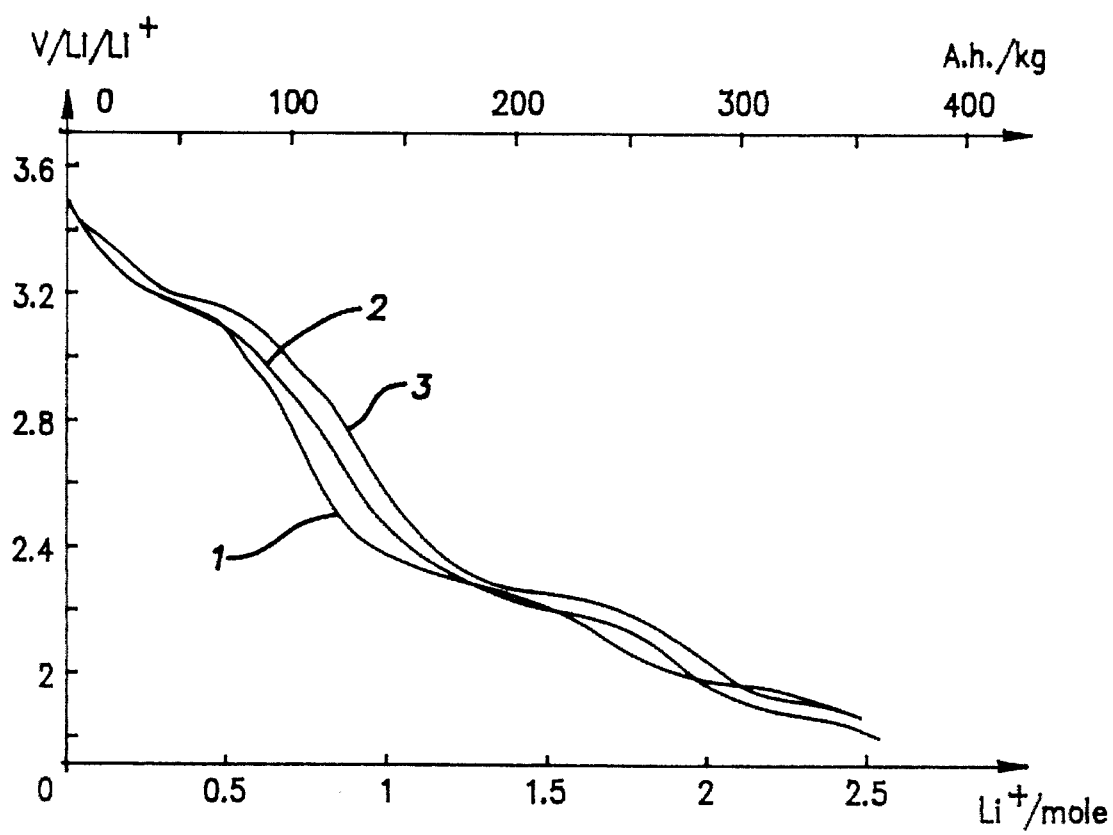
FIG. 9 A reduction chronopotentiogram of the cathode material $Fe_{0.11}V_2O_5$ illustrating the potential as a function of the number of inserted lithium ions for curve 1, the current density is 500 µA/cm², for curve 2 the current density is 200 µA/cm², and for curve 3 the current density is 100 µA/cm².

FIG. 9 shows the reduction chronopotentiograms of the cathode material $Fe_{0.11}V_2O_5$ under different current densities in the potential range between 3.6 and 1.8 V, based on the electrode Li/Li⁺.

Curve 1 refers to a current density of 500 µA/cm², curve 2 to a current density of 200 µA/cm² and curve 3 to a current density of 100 µA/cm².

The shape of the curves confirms the results obtained by the voltamperometric method. More specifically, the insertion of lithium in the cathode material according to the invention takes place in several stages. The first two stages are at an average potential of 3.1 V corresponding to the insertion of approximately 0.9 lithium ion per mole of bronze, the third stage at 2.2 V involves approximately 0.8 lithium ion per mole of bronze and the fourth at about 1.9 V corresponds to the insertion of approximately 0.5 lithium ion per mole of bronze. It is also possible to take account of a complimentary stage at about 2.9 V, where there is a slow and continuous potential drop in place of the sudden potential drop conventionally observed with $V_2O_5$ following the insertion of one lithium ion per mole of $V_2O_5$.

Thus, the maximum faradic capacitance available during the insertion of the lithium in the bronze $Fe_{0.11}V_2O_5$ is approximately 360 Ah/kg.

The influence of the current density on the reduction signal of the bronze reveals an interesting behaviour to the extent that the shape of the signal and the faradic capacitance are not dependent on the current density in the range 100 to 500 µA/cm².

Figure 10:
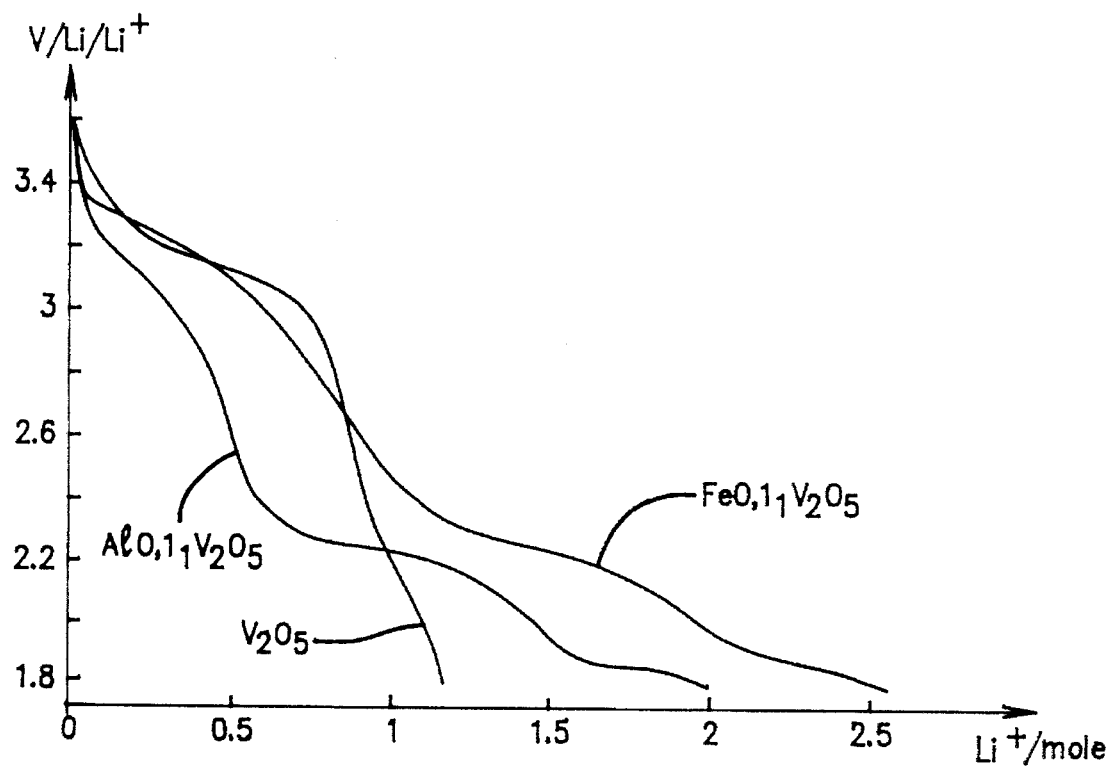
FIG. 10 The reduction chronopotentiogram for constant current density of 500 µA/cm² of the following cathode materials: $V_2O_5$, $Al_{0.11}V_2O_5$, and $Fe_{0.11}V_2O_5$.

FIG. 10 shows the reduction chronopotentiograms at a constant current density of 500 µA/cm² (i.e. potential variations in V based on Li/Li as a function of the number of Li ions inserted per mole of material), relative to cathode materials constituted by a mixture of graphite powder and powder of $V_2O_5$, $Al_{0.11}V_2O_5$ or $Fe_{0.11}V_2O_5$ incorporating 90% graphite.

In the case of iron or aluminium bronzes according to the invention there is a slow and continuous decrease of the potential between 3 and 2.2 V, a faradic balance relative to the first two stages comparable to that of $V_2O_5$, even under high discharge conditions and the presence of a third insertion stage in the form of powerful discharge conditions, which does not exist in the case of $V_2O_5$.

Figure 11:
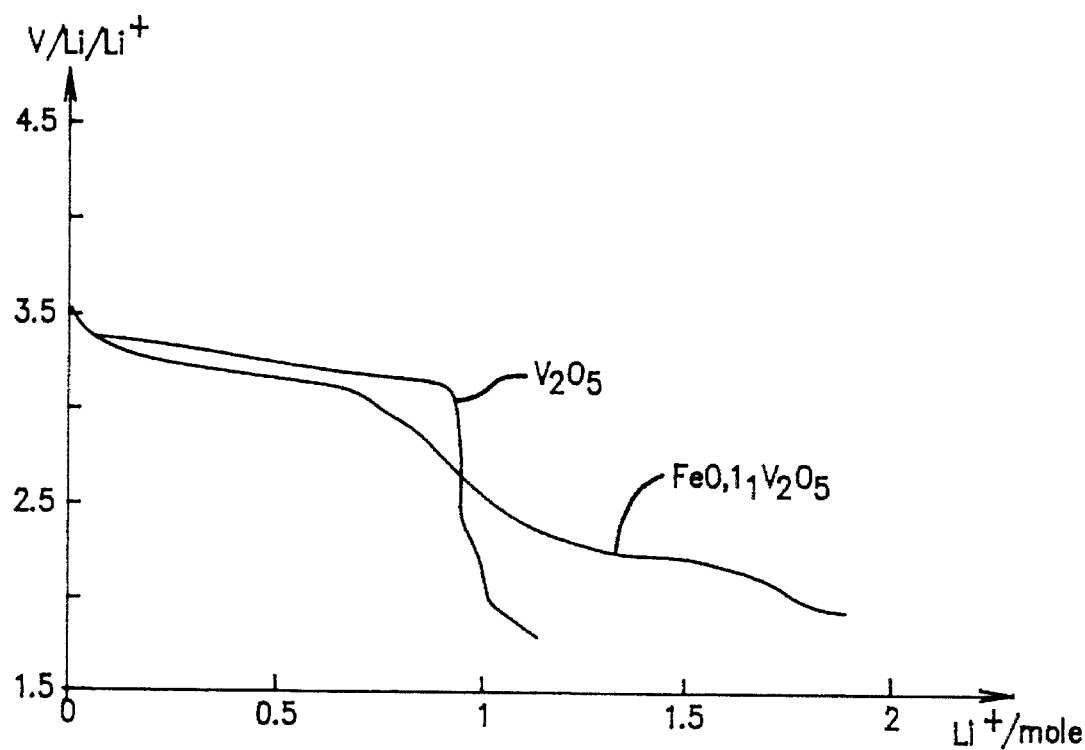
FIG. 11 The reduction chronopotentiogram with constant current density of 40 uA/cm² of the cathode materials $V_2O_5$ and $Fe_{0.11}V_2O_5$ used in pure form.

FIG. 11 shows the reduction chronopotentiograms at a constant current density of 40 µA/cm² of cathode materials constituted solely by pure $V_2O_5$ or pure $Fe_{0.11}V_2O_5$. In this case, the faradic capacitance of the iron bronze according to the invention is much higher than that of $V_2O_5$.

There is also an evaluation of the performance characteristics of the iron bronze in galvanostatic cycling on four reduction stages. The results are given in FIG. 12, which also shows the results obtained under the same conditions with aluminium bronze $Al_{0.11}V_2O_5$ and $V_2O_5$. These cyclings were carried out under a current density of 200 µA/cm in a potential range of 3.7 to 1.7 V including the four insertion stages.

Figure 12:
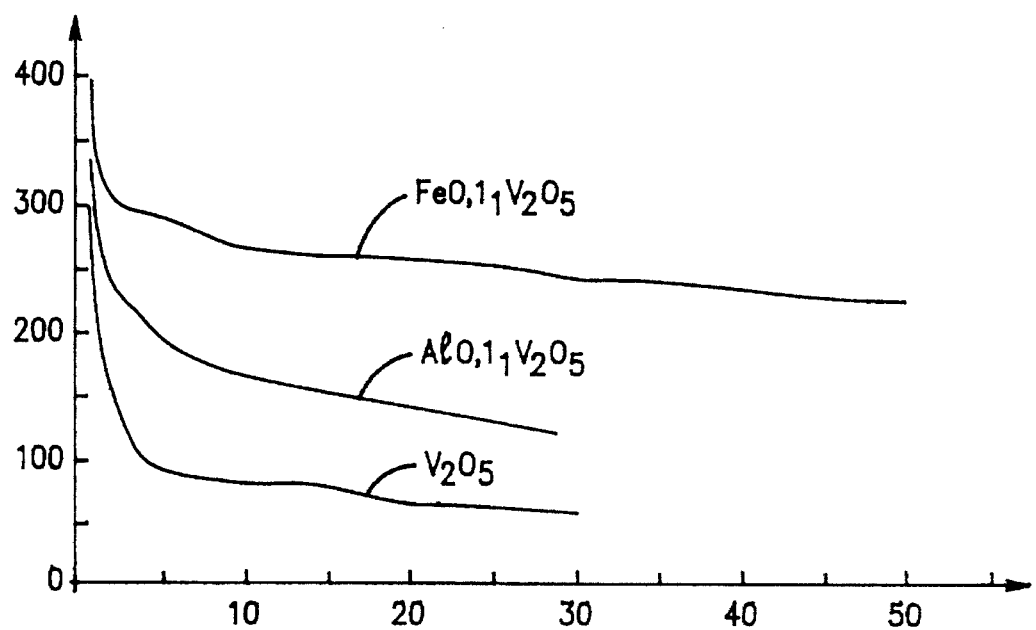
FIG. 12 A graph showing the specific capacitance as a function of the number of galvanostatic cycles performed in the potential range 3.7 to 1.7 V for the cathode materials: $Fe_{0.11}V_2O_5$, $Al_{0.11}V_2O_5$ and $V_2O_5$.

FIG. 12 illustrates the specific capacitance as a function of the number of cycles.

The results obtained reveal the potential of iron bronze, which is a very high performance material, because 65% of the initial faradic capacitance (approximately 400 μh/kg) is still available after the thirtieth cycle (i.e. 200 μh/kg), whereas in the case of $V_2O_5$, the specific capacitance is only 50 μh/kg, i.e. 20% of the initial faradic capacitance after 30 cycles. Therefore iron bronze has much superior performance characteristics to $V_2O_5$.

In the same way, aluminium bronze has superior performance characteristics to $V_2O_5$, because the specific capacitance is approximately three times that of $V_2O_5$ after 30 cycles.

Figure 13:
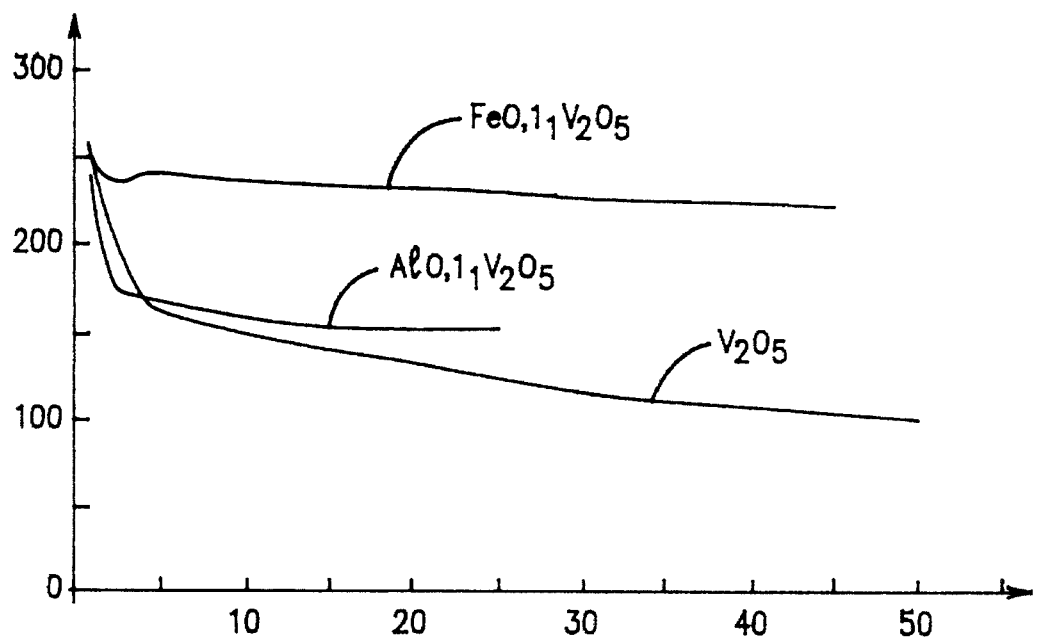
FIG. 13 A graph showing the evolution of the specific capacitance as a function of the number of galvanostatic cycles performed in the potential range 3.8 to 2.1 V for the cathode materials $V_2O_5$, $Fe_{0.11}V_2O_5$ and $Al_{0.11}V_2O_5$.

FIG. 13 shows the results obtained in galvanostatic cycling performed on only three reduction stages, i.e. between 3.9 and 2.1 V/Li/Li$^+$ with a current density of 200 uA/cm$^2$ on the following cathode materials: $Fe_{0.11}V_2O_5$, $Al_{0.11}V_2O_5$ and $V_2O_5$.

In this case, the specific capacitance in Ah/kg is lower, but as previously for $Fe_{0.11}V_2O_5$ and for $Al_{0.11}V_2O_5$, it remains higher than that of $V_2O_5$ after 30 cycles.

We claim:

1. Electrochemical generator comprising an anode, a cathode comprising a vanadium pentoxide-based cathode material, and a conductive electrolyte containing ions which can be intercalated in the cathode material characterized in that the cathode material is a vanadium pentoxide bronze of formula:

$$M^1_{x1}M^2_{x2}V_2O_5$$

in which $M^1$ represents trivalent aluminum or iron, $M^2$ represents a metal different from $M^1$ of valency n chosen from among alkali metals, alkaline earth metals, transition metals and aluminum, n being equal to 1, 2, or 3, and $x_1$ and $x_2$ are such that $0.06 \leq x_1 \leq 0.13$; $0 \leq x_2 \leq 0.20$; and $0.27 \leq 3x_1 + n_2 23\ 0.39$.

2. Electrochemical generator according to claim 1, characterized in that the cathode material complies with the formula:

$$Fe_{x1}V_2O_5$$

with $0.09 \leq x_1 \leq 0.13$.

3. Generator according to claim 1, characterized in that the cathode material complies with the formula:

$$Al_{x1}V_2O_5$$

with $0.09 \leq x_1 \leq 0.13$.

4. Generator according to either of the claims 2 and 3, characterized in that $x_1 = 0.11$.

5. Electrochemical generator according to claim 1, characterized in that the cathode material complies with the formula:

$$Fe_{x1}Al_{x2}V_{25}$$

in which $x_1$ and $x_2$ are as defined in claim 1.

6. Generator according to any one of the claims 1, 2, 3, and 5 characterized in that the anode is of lithium, lithium alloy, or lithium insertion compound.

7. Generator according to claim 6, characterized in that the electrolyte is constituted by a solution of lithium salt in an organic solvent.

8. Generator according to claim 7, characterized in that the electrolyte is a solution of lithium perchlorate in propylene carbonate.

* * * * *